United States Patent
Palenius et al.

(10) Patent No.: US 10,333,683 B2
(45) Date of Patent: Jun. 25, 2019

(54) THRESHOLDS FOR RADIO LINK MONITORING WITH ADVANCED RECEIVERS

(71) Applicant: Telefonaktiebolaget LM Ericsson (publ), Stockholm (SE)

(72) Inventors: Torgny Palenius, Barsebäck (SE); Christopher Callender, Kinross (GB); Maomao Chen, Arlöv (SE); Fredrik Nordström, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 233 days.

(21) Appl. No.: 15/152,711

(22) Filed: May 12, 2016

(65) Prior Publication Data

US 2016/0337227 A1 Nov. 17, 2016

Related U.S. Application Data

(60) Provisional application No. 62/161,908, filed on May 15, 2015.

(51) Int. Cl.
*H04L 5/00* (2006.01)
*H04W 24/08* (2009.01)
(Continued)

(52) U.S. Cl.
CPC .............. *H04L 5/0073* (2013.01); *H04L 1/20* (2013.01); *H04W 24/08* (2013.01); *H04W 48/16* (2013.01);
(Continued)

(58) Field of Classification Search
CPC ........ H04L 5/0073; H04L 1/20; H04W 24/08; H04W 48/16
See application file for complete search history.

(56) References Cited

U.S. PATENT DOCUMENTS

2014/0016677 A1* 1/2014 Dua ..................... H04L 25/0216
375/148
2014/0071844 A1* 3/2014 Mujtaba .............. H04W 52/028
370/252
(Continued)

FOREIGN PATENT DOCUMENTS

WO 2014109689 A1 7/2014

OTHER PUBLICATIONS

ETSI TS 136 133, LTE; Evolved Univeral Terrestrial Radop Access (E-UTRA); Requirements for Support of radio resource management (3GPP TS 36.133 Version 12.6.0 Release 12), May 4, 2015, total 3 pages.*
(Continued)

*Primary Examiner* — Albert T Chou
(74) *Attorney, Agent, or Firm* — Coats & Bennett, PLLC (57) ABSTRACT

Different Out-of-sync thresholds are defined for Radio Link Monitoring by a UE having a selectively enabled advanced receiver feature. When the advanced receiver feature is disabled, the UE monitors received signal quality and compares a signal quality metric to a first threshold developed for a reference receiver. When the advanced receiver feature is enabled, the UE compares the signal quality metric to a second threshold indicating lower signal quality than the first threshold. In either case, if the signal quality meets the respective threshold, the UE goes Out-of-sync. The Out-of-sync UE continues to monitor received signal quality. Regardless of whether the advanced receiver feature is enabled or not, a third threshold, developed for the reference receiver, is applied to determine when to return to In-sync. In one embodiment, the reference receiver enables two antennas, and the advanced receiver feature is enabling four antennas.

32 Claims, 7 Drawing Sheets

(51) Int. Cl.
*H04W 48/16* (2009.01)
*H04L 1/20* (2006.01)
*H04W 52/36* (2009.01)
*H04B 17/336* (2015.01)

(52) U.S. Cl.
CPC ......... *H04B 17/336* (2015.01); *H04W 52/367* (2013.01)

(56) References Cited

U.S. PATENT DOCUMENTS

| | | | | |
|---|---|---|---|---|
| 2014/0098754 | A1* | 4/2014 | Luo | H04L 5/0053 370/329 |
| 2014/0098761 | A1* | 4/2014 | Lee | H04W 74/006 370/329 |
| 2014/0200001 | A1* | 7/2014 | Song | H04W 36/0094 455/436 |
| 2016/0242064 | A1* | 8/2016 | Lee | H04W 24/10 |
| 2016/0302094 | A1* | 10/2016 | Yum | H04W 24/10 |
| 2016/0309355 | A1* | 10/2016 | Seo | H04W 8/005 |
| 2017/0244435 | A1* | 8/2017 | Yamada | H04B 1/1027 |
| 2017/0318490 | A1* | 11/2017 | Yang | H04W 24/08 |
| 2017/0366999 | A1* | 12/2017 | Tsuboi | H04W 24/10 |

OTHER PUBLICATIONS

Intel Corporation, "RLM impacts of 4Rx", R4-152146, 3GPP TSG-RAN WG4 Meeting #74bis, Rio de Janeiro, Brazil, Apr. 24-25, 2015, pp. 1-3.
3GPP TSG-RAN WG4 Meeting # 75 7.8.3, R4-152846, Feasibility of RLM requirements for 4RX, Fukuoka, Japan, May 25-29, 2015, pp. 1-9.
3GPP TSG RAN Meeting # 67 13.1.4, RP-150427 (revision of RP-150142), LTE DL 4 Rx antenna ports, Shanghai, China, Mar. 9-12, 2015, pp. 1-8.

* cited by examiner

THRESHOLDS FOR RADIO LINK MONITORING WITH ADVANCED RECEIVERS

RELATED APPLICATION

This application claims priority to U.S. Provisional Patent Application Ser. No. 62/161,908, filed May 15, 2015, the disclosure of which is incorporated by reference herein, in its entirety.

FIELD OF INVENTION

The present invention relates generally to wireless communications, and in particular to a system and method of setting radio link monitoring thresholds for User Equipment having advanced receiver configurations.

BACKGROUND

In a cellular wireless communication network, fixed base stations (referred to as NodeB or eNodeB in LTE) provide wireless communication services across an air interface to a plurality of subscribers' User Equipment (UE) within a geographic area (sometimes called a cell) via modulated radio frequency signals. A variety of factors affect the quality with which UE may receive signals transmitted from a NodeB, as quantified by various metrics, such as Block Error Rate (BLER), Signal to Noise Ratio (SNR), Signal to Interference and Noise Ratio (SINR), and the like. Such factors may include geographic distance of the UE from the NodeB, intervening terrain and structures, meteorological conditions, RF interference from other sources, multipath interference, Rayleigh fading, and other factors. If received signal quality is consistently too poor for reliable communications, a UE is preferably "handed over" to a different NodeB providing better quality signals, with the network diverting the data stream from the poorer (source) NodeB to the better (target) one. If a UE cannot be handed off, and received signal quality continues to deteriorate, the UE goes out-of-sync (also called out-of-service) and the network terminates service to it.

The mechanism for Radio Link Monitoring (RLM), the thresholds defining out-of-sync, and the like, are specified in the 3rd Generation Partnership Program (3GPP) technical specification 36.133, Evolved Universal Terrestrial Radio Access (E-UTRA); Requirements for support of radio resource management, section 7.6, the disclosure of which is incorporated herein by reference in its entirety. In particular, the lower threshold on received signal quality, Qout, which will cause a UE to go out-of-sync, is a received BLER on the Physical Dedicated Control Channel (PDCCH) of greater than 10%. This is valid also when no PDCCH is received; in that case a mapping between the BLER and SNR or some other metric of signal quality must be utilized to set the threshold. As long as the estimated performance of the PDCCH, for a given payload size and allocation size (code rate), expressed as BLER, is less than 10%, the radio link is seen as useful. When the estimated BLER has increased to be larger than 10%, Out-of-sync is declared and the UE ceases to transmit. In particular, the physical layer L1 signals Out-of-sync to higher layers, terminating transmission, when the UE is unable to successfully decode PDCCH at the 10% BLER for the number of 200 ms intervals specified in the parameter n310. This starts a timer t310 (in seconds), the expiry of which (without regaining In-sync) results in L1 reporting link failure.

A higher quality reception is required to return a UE to In-sync (also called In-service). In particular, after Out-of-sync has been declared, an estimated BLER on PDCCH of 2% or less (Qin) is required. The UE must successfully decode PDCCH at this level for the number of 100 ms intervals specified in the parameter n311.

Figure 1:
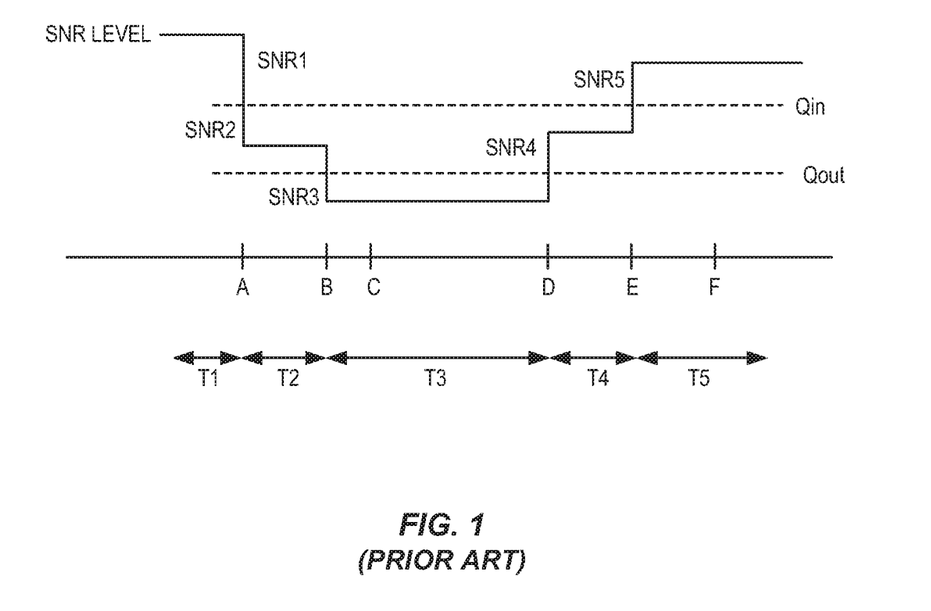
FIG. 1 is a diagram depicting Out-of-sync and In-sync operation of a reference receiver.

FIG. 1 depicts a graphic representation of received signal quality over time, and depicts the operation of the different Qout and Qin thresholds. Note that FIG. 1 depicts received signal quality as SNR; the UE may measure or estimate the BLER on PDCCH from the SNR of the received signal. Accordingly, the thresholds Qout and Qin depicted in FIG. 1 are SNR levels that correspond to an estimated 10% and 2% BLER on PDCCH, respectively.

Initially, a very high quality signal is received, having SNR1 prior to time A. At time A, the signal quality degrades to SNR2, but is still higher than the Qout threshold. Ideally, this lower signal quality may trigger a handover to another NodeB. If not, when the signal quality degrades below Qout—such as SNR3 beginning at time B—the UE shall declare Out-of-sync within the parameter n310 number of 200 ms intervals for which the reception is below Qout. In the example of FIG. 1, n310=1, and the UE declares Out-of-sync, and starts timer t310, at time C. While the UE remains Out-of-sync, it continuously attempts to receive and decode DL traffic until the timer t310 expires.

At time D, the received signal quality improves to SNR4, which is well above the Qout threshold. However, this is still insufficient for the UE to regain synchronization and service. Rather, the UE must wait until the received signal quality improves to be above the Qin threshold—as depicted by SNR5 at time E. In this example, time E occurs sooner than the expiration of the t310 timer. At this point, the UE must wait for the parameter n311 number of 100 ms intervals in which it continuously decodes PDCCH above the Qin threshold. In the example depicted in FIG. 1, n311=1, and the UE L1 declares In-sync status to higher layers at time F. At this point, the UE is again In-sync, and continues to receive wireless service from the network.

The 3GPP standards for RLM are specified with respect to a reference receiver, which is a UE with two receiver antennas (2 Rx). Various advanced receiver architectures are known, in which the receiver enhancements may be selectively enabled, such as the use of a greater number of receiver antennas, Minimum Mean Square Error (MMSE) and Interference Rejection Combiner (IRC) techniques, advanced cancellation of neighboring cell interference, and the like. For the purpose of discussion herein, a representative advanced receiver is one having four receiver antennas, also denoted as a 4 Rx receiver or simply 4 Rx, although this is not the only type of advanced receiver contemplated. The use of more receiver antennas enables the UE to increase the throughput and enhance coverage in some scenarios, both by improving the link level performance for certain configurations and by allowing the use of up to 4 layers MIMO. The requirements for different advanced receivers have been added to the demodulation performance requirements in 3GPP TS 36.101.

When specifying, e.g., the 4Rx receivers, it will not be required by the UE to always have the 4Rx functionality activated. The idea is to only have it configured when receiving data and in scenarios where there is a substantial gain. The power consumption when four receivers are activated is substantially higher than using two receivers, so the UE is allowed to fall back to two-receiver operation when 4Rx is not needed.

With advanced receiver types, PDCCH BLER should be reduced at typical scenarios compared with the reference receivers. Accordingly, the received SNR, where the PDCCH BLER becomes 10% for Out-of-sync and 2% for In-sync, are reduced by typically 3 dB for 4 Rx, compared to 2 Rx. However, the currently specified RLM is based on 10% and 2% BLER on basic reference receivers. The thresholds in the testing are set as SNR levels, where the estimated PDCCH BLER performance of the reference receiver is 10% and 2%. No advanced receivers are assumed.

The synchronization tests can be changed to adapt the thresholds to correspond to the estimated BLER performance for PDCCH when an advanced receiver, e.g. 4 Rx, is used. However, the advanced receiver feature, e.g. 4 Rx receiver, is only assumed to be used when data is scheduled to the UE and there is a clear benefit for the link level performance to use 4 Rx. In this case if 4 Rx is used when going Out-of-sync and 4 Rx is assumed when going In-sync again, then the received signal quality still may be below the Out-of-sync threshold for the basic 2 Rx reference receiver, yet the UE achieves acceptable performance due to the benefit of the advanced receiver feature.

When a UE goes Out-of-sync, the network will stop scheduling transmissions to it. Also, the network will not schedule data to a UE directly after it goes In-sync. Wth no data scheduled, there is no reason for the UE to keep the high-power-consumption 4 Rx feature activated, and it will typically switch to a 2 Rx receiver configuration, e.g., for saving battery life. When the UE decides to fall back from the 4 Rx receiver to the 2 Rx receiver, the estimated PDCCH BLER suddenly increases (for the same actual signal reception conditions). This raises the risk that the UE directly will go into Out-of-sync again. Thus, the sync status of UE will not be stable.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments of the present invention described and claimed herein, different Out-of-sync thresholds are defined for the basic reference receiver and certain advanced receivers such as 4Rx. Thereby the coverage of the advanced receiver during a call is improved. This increases possibility to send DL handover messages to the UE, which is thus able to perform a handover to a better cell before the UE goes Out-of-sync and eventually Radio Link Failure is declared. However, once the UE goes Out-of-sync, it is assumed the UE will disable the advanced receiver feature to save power, and hence the basic reference receiver is assumed for In-sync consideration. That is, only the standard Qin threshold (e.g., estimated 2% BLER on the PDCCH) is used to return a receiver to synchronization with the network.

One embodiment relates to a method of Radio Link Monitoring by User Equipment (UE) having a selectively enabled advanced receiver feature and operative in a wireless communication network. The advanced receiver feature is selectively enabled and disabled while the UE maintains an In-sync status wherein the network schedules communications to the UE. Received signal quality is measured on one or more channels and a signal quality metric is generated. The signal quality metric is monitored. An Out-of-sync status, wherein the network does not schedule data to the UE, is assumed if the advanced receiver feature is disabled and the signal quality metric meets a first threshold. The Out-of-sync status is assumed if the advanced receiver feature is enabled and the signal quality metric meets a second threshold indicating lower signal quality than the first threshold.

Another embodiment relates to a User Equipment (UE) having a selectively enabled advanced receiver feature and operative in a wireless communication network. The UE includes one or more antennas; a transceiver operatively connected to the antennas; and a processor operatively connected to the transceiver. The processor is operative to selectively enable and disable the advanced receiver feature while the UE maintains an In-sync status wherein the network schedules communications to the UE; measure received signal quality on one or more channels and generate a signal quality metric; monitor the signal quality metric; assume an Out-of-sync status, wherein the network does not schedule data to the UE, if the advanced receiver feature is disabled and the signal quality metric meets a first threshold; and assume the Out-of-sync status if the advanced receiver feature is enabled and the signal quality metric meets a second threshold indicating lower signal quality than the first threshold.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

According to one embodiment, when the UE is monitoring the Radio Link Monitoring (RLM) status, for LTE specified in 3GPP TS 36.133, section 7.6, the UE triggers the Out-of-sync threshold based on an estimated performance as specified for Out-of-sync and the actual receiver type used by the UE when the monitoring is used. For example, a UE configured as a reference receiver (e.g., 2 Rx) would use the standard Qout; a UE deploying a more advanced (and higher power-consuming) configuration, such as a MMSE 2 Rx receiver or 4 Rx receiver, would use a modified Qout threshold (e.g., 3 dB lower) when determining whether to go Out-of-sync in poor reception conditions.

According to one embodiment, when the UE is monitoring the Radio Link Monitoring (RLM) status, for LTE specified in 36.133, section 7.6, the In-sync threshold is always based on the estimated performance as specified for In-sync using the basic reference receiver, e.g. a 2 Rx receiver, independently of the receiver configuration actually used when the UE was going Out-of-sync (or that which the receiver used when going In-sync).

This UE behavior is based on the implementation of any type advanced receivers and the corresponding capabilities. The network may ascertain which receiver type the UE uses by the capability signalling indicating receiver type. With that signalling, the Out-of-sync threshold used by the UE is known by the Network.

The network may control the thresholds used by the UE in at least two ways. First, the network may, based on the capability signaling, send a signal to an individual UE instructing it to either use the advanced receiver limits corresponding to the capability of the UE, or to use the limits based on the basic reference receiver.

Second, a signal may be sent in the broadcast signaling, indicating that any UE shall use either the thresholds based on the advanced receiver corresponding to the UE's capability, or the UE shall use the basic reference receiver limits for Radio Link Monitoring.

Figure 2:
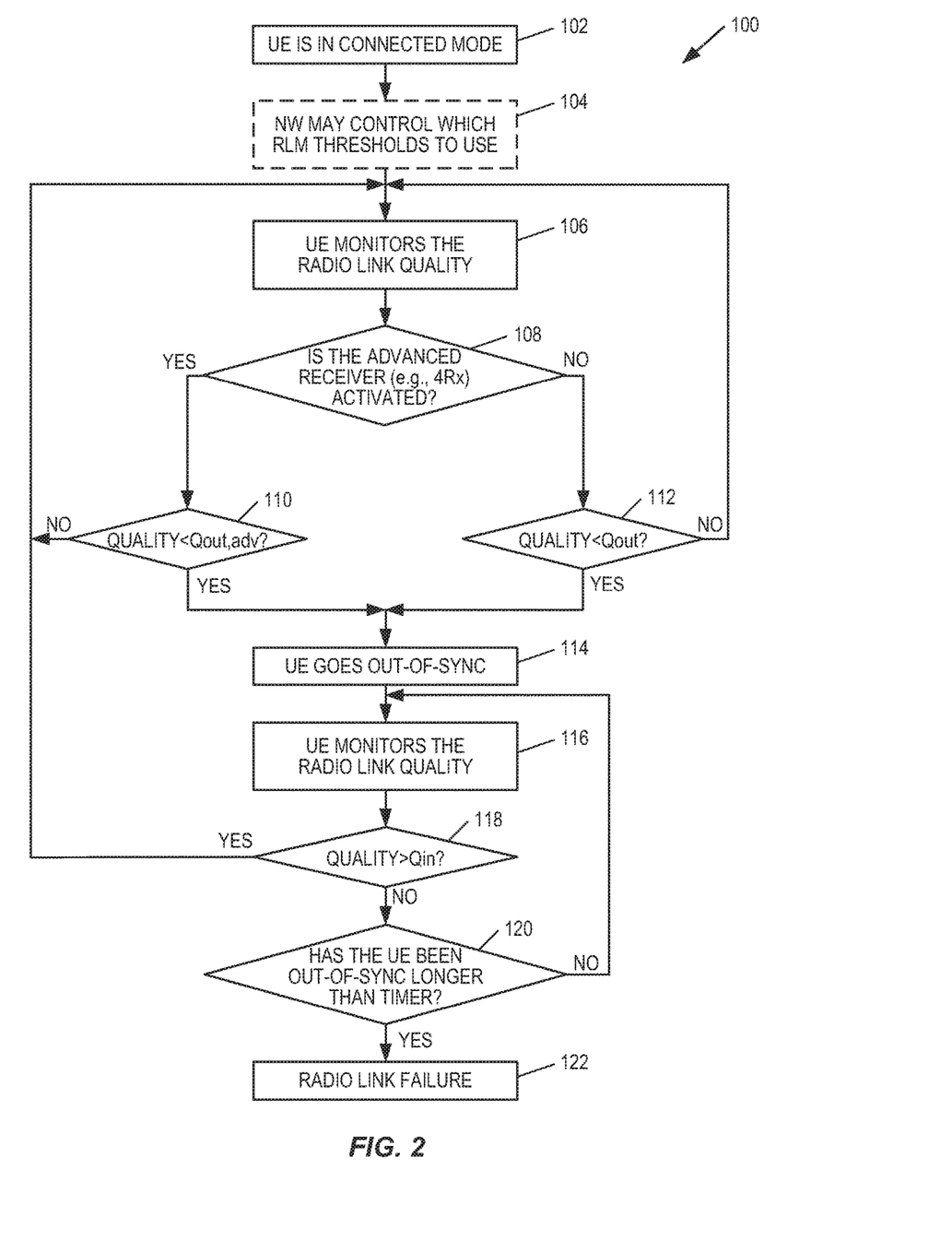
FIG. 2 is a flow diagram of a method of UE synchronization with a network.

FIG. 2 depicts a method 100 of a UE going out of and into synchronization with the network. Initially, a UE is in connected mode (block 102). In some embodiments, the network my control the RLM thresholds for the UE to use, based on its receiver configuration (block 104). For example, the network may accomplish this via signaling to a specific UE, or in a broadcast message for all UEs in the cell. The UE monitors the status of the Radio Link (block 106), e.g., estimating the BLER on PDCCH.

The threshold which the UE utilizes to decide whether to go Out-of-sync is based on the receiver type the UE is currently using. If the UE is utilizing a reference receiver configuration (e.g., 2 Rx) (block 108), then the current radio link quality metric is compared to the conventional threshold Qout (e.g., an estimated 10% BLER on PDCCH) (block 112). If the radio link quality is above the threshold Qout (block 112), then the UE continues operation, and continues to monitor the link quality (block 106). If the radio link quality is at or below the threshold Qout (block 112), then the UE goes Out-of-sync (block 114).

On the other hand, if the UE is utilizing an advanced receiver configuration (e.g., 4 Rx) (block 108), then the current radio link quality metric is compared to an advanced receiver threshold Qout,adv (e.g., 3 dB lower than Qout) (block 110). If the radio link quality is above the threshold Qout,adv (block 110), then the UE continues operation, and continues to monitor the link quality (block 106). If the radio link quality is at or below the threshold Qout,adv (block 110), then the UE goes Out-of-sync (block 114).

In either case, once it is Out-of-sync, the UE continues to monitor the radio link quality (block 116). If it improves again so that the quality is better than Qin (e.g., estimated 2% BLER on PDCCH) (block 118), the UE enters the In-sync state again and the radio link is restored (block 106). Note that the same threshold Qin is used, regardless of whether Qout or Qout,adv was used when the UE went Out-of-sync. This is because it is assumed that the UE will not continue to utilize its advanced receiver configuration (e.g., 4 Rx)—and suffer the concomitant battery life consumption—when the UE is Out-of-sync and the advanced receiver configuration does not result in any greater bandwidth or data rate to the UE. Once Out-of-sync, the UE will, for a predefined time (block 120) continue to monitor the radio link quality (block 116) and compare it to the In-sync threshold Qin (block 118). If the UE remains Out-of-sync for the predefined time (block 120) it will declare Radio Link Failure and the connection will be closed down (block 122).

Note that, in the method 100 of FIG. 2, there is a control flow split when going Out-of-sync, depending on whether an advanced receiver threshold Qout,adv or basic reference receiver threshold Qout is applied. On the other hand, there is no split—that is, the same threshold Qin is applied in all cases—when determining whether to go In-sync.

Figure 3:
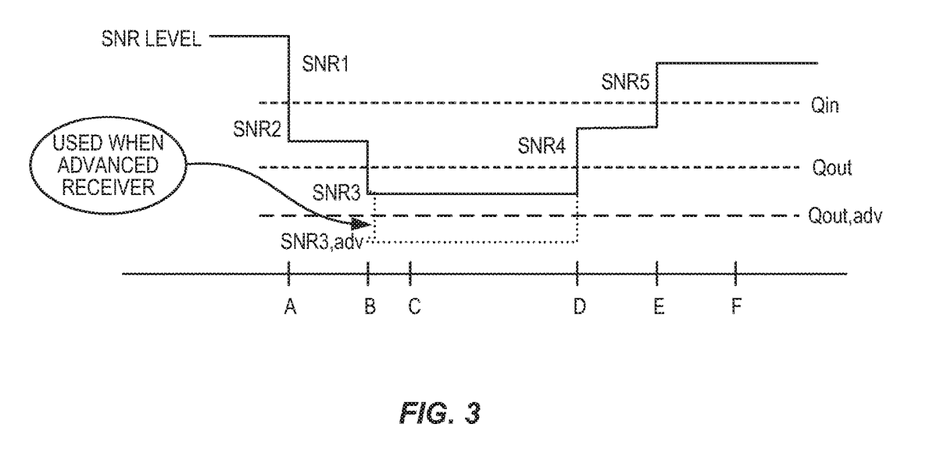
FIG. 3 is the diagram of FIG. 1 with a different Out-of-sync threshold for an advanced receiver depicted.

FIG. 3 is a diagram of received signal quality over time for a UE having an advanced receiver feature (such as 4 Rx). FIG. 3 is similar to FIG. 1 discussed in the Background, but additionally shows the lower SNR3,adv applicable to the Out-of-sync determination for an advanced receiver configuration. That is, if an advanced receiver configuration is enabled, the UE will only be considered Out-of-sync if a received signal has a signal quality below the threshold Qout,adv. When going back to In-sync, the levels SNR4 and SNR5 are compared to the same threshold Qin, regardless of whether or not the advanced receiver configuration was enabled when the UE went Out-of-sync.

Figure 4:
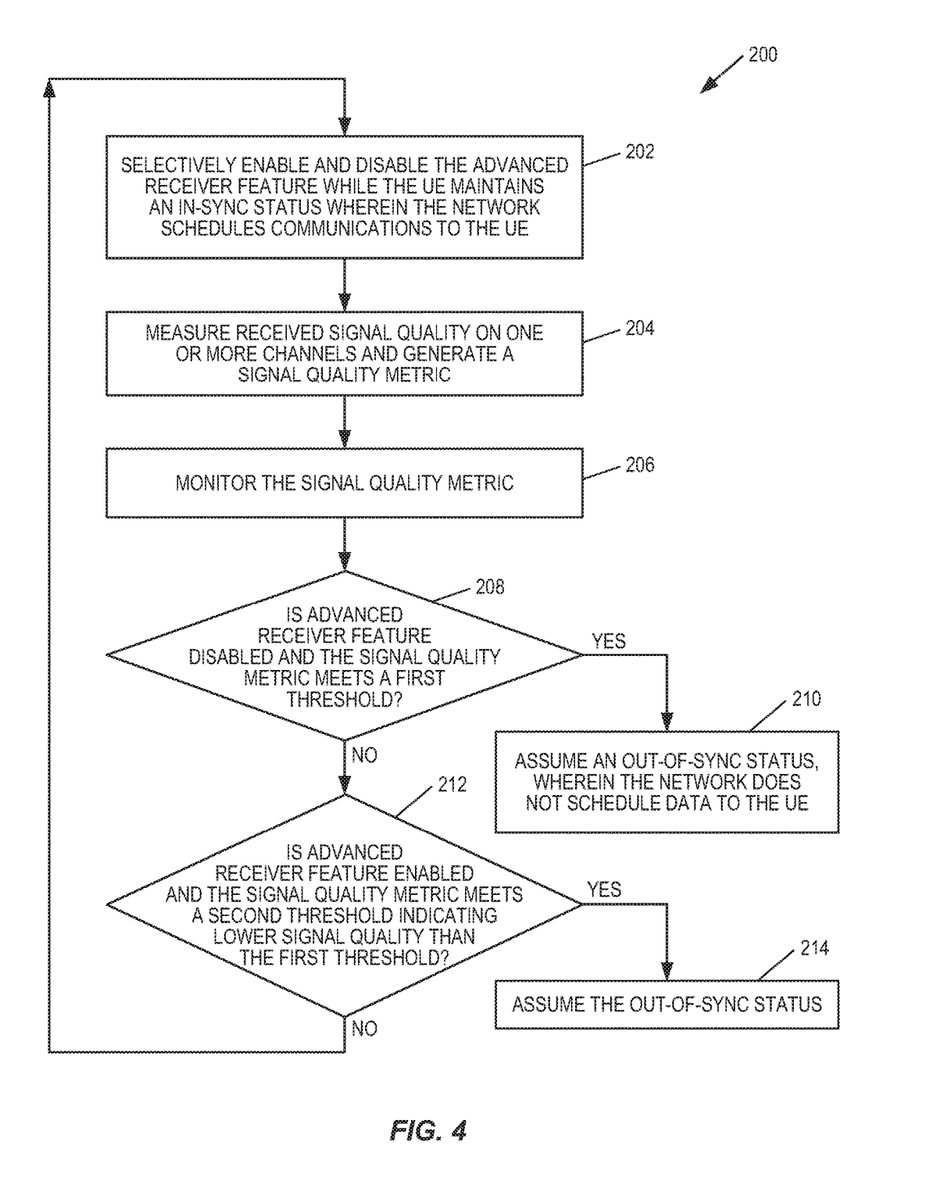
FIG. 4 is a flow diagram of a method of Radio Link Monitoring.

FIG. 4 depicts a method 200 of Radio Link Monitoring by a UE having a selectively-enabled advanced receiver feature and operative in a wireless communication network. During use, the UE selectively enables and disables the advanced receiver feature while it maintains an In-sync status, wherein the network schedules communications to the UE (block 202). On a continuous or periodic basis, the UE measures received signal quality (e.g., SNR, SNIR, BLER) on one or more channels and generates a signal quality metric (block 204) (e.g., estimated BLER on PDCCH). The UE monitors the signal quality metric (block 206). If the advanced receiver feature is disabled and the signal quality metric meets a first threshold (block 208), such as Qout, then the UE assumes an Out-of-sync status, wherein the network does not schedule data to the UE (block 210). If the advanced receiver feature is enabled and the signal quality metric meets a second threshold indicating lower signal quality than the first threshold (block 212), such as Qout,adv, then the UE assumes the Out-of-sync status (block 214).

Figure 5:
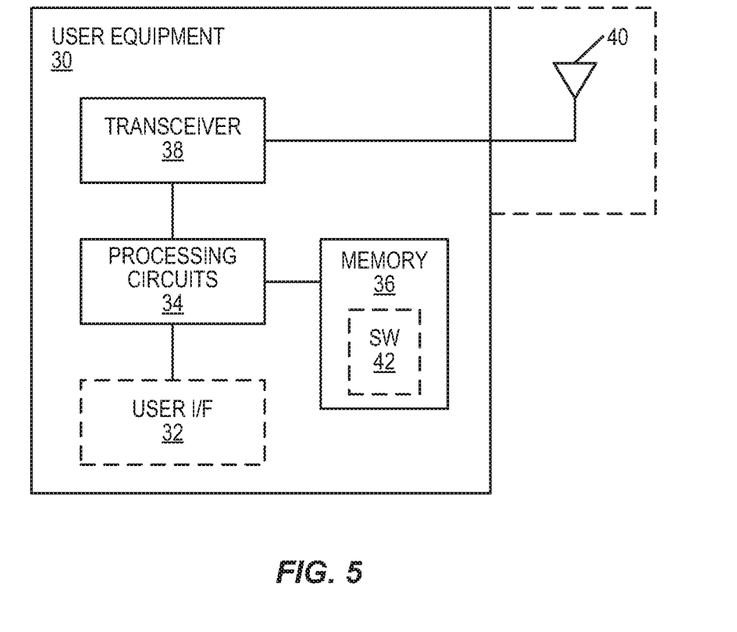
FIG. 5 is a block diagram of a UE.

FIG. 5 depicts a UE 30 operative in embodiments of the present invention. As those of skill in the art are aware, a UE 30 is a device, which may be battery-powered and hence mobile, operative within a wireless communication network. The UE 30 may include a user interface 32 (display, touchscreen, keyboard or keypad, microphone, speaker, and the like); processing circuits 34; memory 36; and a radio circuitry, such as one or more transceivers 38, antennas 40, and the like, to effect wireless communication across an air interface to one or more NodeBs. In some applications, the UE may comprise a Machine Type Communication (MTC) or Narrowband Internet of Things (NB-IoT) wireless device, which may have a limited, or no, user interface 32. In some embodiments, the antennas 40 may comprise a plurality of antennas—e.g., four or more—the utilization of which is selectively controlled by the UE. As indicated by the dashed line, the antennas 40 may be external to the UE, or may be disposed within its housing (e.g., as in most smartphones). The UE 30 may additionally include features such as a camera, removable memory interface, short-range communication interface (Wi-Fi, Bluetooth, and the like), wired interface (USB), and the like (not shown in FIG. 5).

According to embodiments of the present invention, the memory 36 is operative to store, and the processing circuits 34 are operative to execute, software 42 which when executed is operative to cause the UE 30 to adopt different thresholds for Out-of-sync determination during RLM depending on its receiver configuration, and to use the same threshold for In-sync determination regardless of its receiver configuration, as described herein. The memory 36 is also operative to store, and the processing circuits 34 are operative to conditionally execute, software implementing advanced receiver functions, such as MMSE, IRC, four+ layer MIMO, and the like.

The processing circuits 34 may comprise one or more circuits, with each executing computational, signal processing, and/or control functions, as required or desired. Each such processing circuit 34 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuitry may comprise one or more transceivers 38 used to communicate with one or more other transceivers via a Radio Access Network according to one or more communication protocols known in the art or that may be developed, such as IEEE 802.xx, CDMA, WCDMA, GSM, LTE, LTE-Adv., NB-IoT, UTRAN, WMax, or the like. The transceiver 38 implements transmitter and receiver functionality appropriate to the Radio Access Network links (e.g., frequency allocations and the like). The transmitter and receiver functions may share circuit components and/or software, or alternatively may be implemented separately. In particular, a UE 30 according to embodiments of the present invention may include a transceiver 38 operative to selectively control and exploit the use of a variable number of antennas 40—e.g., two antennas at a time, four antennas at a time, or the like.

Figure 6:
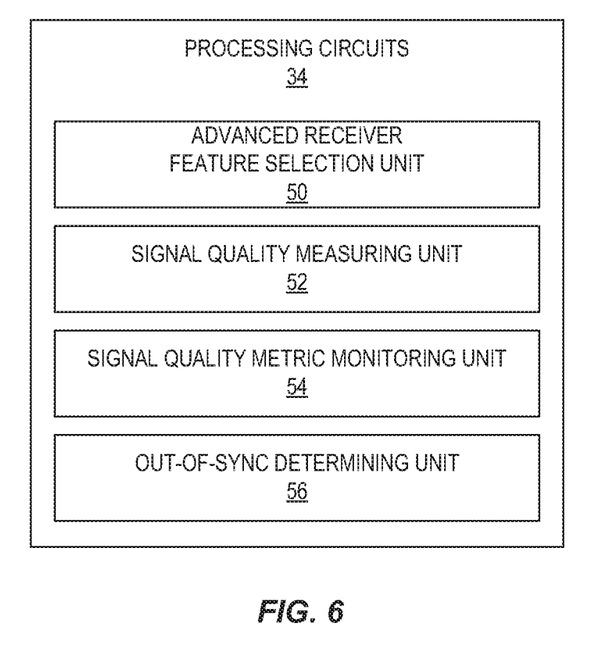
FIG. 6 is block diagram of exemplary processing circuitry in a UE.

FIG. 6 illustrates example processing circuitry 34, such as that in the UE 30 of FIG. 5. The processing circuitry 34 comprises a plurality of physical units. In particular, the processing circuitry 34 comprises an advanced receiver feature selection unit 50, a signal quality measuring unit 52, a signal quality metric monitoring unit 54, and an Out-of-sync determining unit 56. The advanced receiver feature selection unit 50 is configured to selectively enable and disable an advanced receiver feature (e.g., 4 Rx, MMSE, IRC, etc.) while the UE 30 maintains an In-sync status wherein the network schedules communications to the UE 30. The signal quality measuring unit 52 is configured to measure received signal quality on one or more channels and generate a signal quality metric. The signal quality metric monitoring unit 54 is configured to monitor the signal quality metric generated by the signal quality measuring unit 52. The Out-of-sync determining unit 56 is configured to assume an Out-of-sync status, wherein the network does not schedule communications to the UE 30, if the advanced receiver feature is disabled by the advanced receiver feature selection unit 50 and the signal quality metric meets a first threshold. The Out-of-sync determining unit 56 is further configured to assume the Out-of-sync status if the advanced receiver feature is enabled by the advanced receiver feature selection unit 50 and the signal quality metric meets a second threshold indicating lower signal quality than the first threshold.

Figure 7:
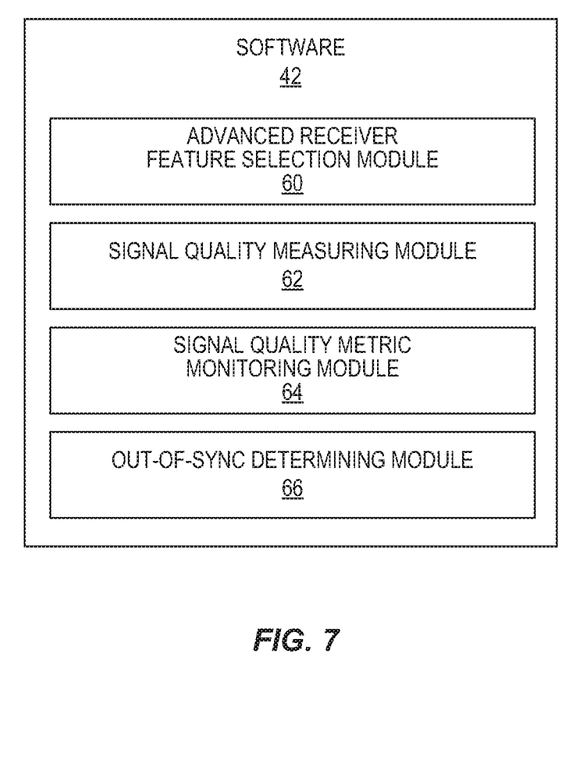
FIG. 7 is a block diagram of exemplary software executed by processing circuitry in a UE.

FIG. 7 illustrates example software 42, such as that depicted in the memory 36 of the UE 30 of FIG. 5. The software 42 comprises a plurality of software modules. In particular, the software 42 comprises an advanced receiver feature selection module 60, a signal quality measuring module 62, a signal quality metric monitoring 64, and an Out-of-sync determining unit 66. The advanced receiver feature selection module 60 is configured to selectively enable and disable an advanced receiver feature (e.g., 4 Rx, MMSE, IRC, etc.) while the UE 30 maintains an In-sync status wherein the network schedules communications to the UE 30. The signal quality measuring module 62 is configured to measure received signal quality on one or more channels and generate a signal quality metric. The signal quality metric monitoring module 64 is configured to monitor the signal quality metric generated by the signal quality measuring module 62. The Out-of-sync determining module 66 is configured to assume an Out-of-sync status, wherein the network does not schedule communications to the UE 30, if the advanced receiver feature is disabled by the advanced receiver feature selection module 60 and the signal quality metric meets a first threshold. The Out-of-sync determining module 66 is further configured to assume the Out-of-sync status if the advanced receiver feature is enabled by the advanced receiver feature selection module 60 and the signal quality metric meets a second threshold indicating lower signal quality than the first threshold.

Embodiments of the present invention present numerous advantages over the prior art. As advanced receiver features are developed and more widely deployed, an increasing number of UEs 30 will be able to remain In-sync, with adequate performance, at levels of actual signal reception that would cause a reference receiver to go Out-of-sync. Lowering the Out-of-sync threshold according to a UE advanced receiver feature currently employed improves system performance by allowing continued connectivity in poor radio conditions, and greater opportunity for handover. Also, once a UE 30 goes Out-of-sync, advanced receiver features are likely to be disabled, for power savings. Accordingly, the reference receiver In-sync quality threshold will typically be applicable, and should be utilized. This combination of a configurable Out-of-sync and fixed In-sync threshold will yield more stable performance, precluding the "ping-pong" effect of a UE 30 oscillating between Out-of-sync and In-sync as its advanced receiver feature is enabled and disabled.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of Radio Link Monitoring by User Equipment (UE) having a selectively enabled advanced receiver feature and operative in a wireless communication network, comprising:
    selectively enabling and disabling the advanced receiver feature while the UE maintains an In-sync status wherein the network schedules communications to the UE;
    measuring received signal quality on one or more channels and generating a signal quality metric;
    monitoring the signal quality metric;
    assuming an Out-of-sync status, wherein the network does not schedule communications to the UE, if the advanced receiver feature is disabled and the signal quality metric meets a first threshold; and
    assuming the Out-of-sync status if the advanced receiver feature is enabled and the signal quality metric meets a second threshold indicating lower signal quality than the first threshold.

2. The method of claim 1 further comprising, when the UE is Out-of-sync:
    measuring received signal quality on one or more channels to generate a signal quality metric;
    monitoring the signal quality metric; and
    assuming an In-sync status, wherein the network schedules data to the UE, if the signal quality metric meets a third threshold, regardless of whether the advanced receiver feature is enabled or disabled.

3. The method of claim 1 wherein the advanced receiver feature comprises enabling more than two antennas.

4. The method of claim 3 wherein the advanced receiver feature comprises enabling four antennas.

5. The method of claim 1 wherein the advanced receiver feature comprises a Minimum Mean Square Error (MMSE) technique to improve receiver performance.

6. The method of claim 1 wherein the advanced receiver feature comprises an Interference Rejection Combiner (IRC) technique to improve receiver performance.

7. The method of claim 1 wherein the advanced receiver feature comprises an advanced cancellation of neighboring cell interference technique to improve receiver performance.

8. The method of claim 1 wherein the first threshold is a Block Error Rate (BLER) of 10% and the second threshold is a BLER of greater than 10%.

9. The method of claim 2 wherein the third threshold is a BLER of 2%.

10. The method of claim 1 wherein the first threshold is a Signal to Noise Ratio (SNR) corresponding to a BLER of 10% and the second threshold is a SNR corresponding to a BELR of greater than 10%.

11. The method of claim 2 wherein the third threshold is a SNR corresponding to a BELR of 2%.

12. The method of claim 1 wherein the UE signals to the network when the advanced receiver feature is enabled or disabled.

13. The method of claim 2 wherein the network signals the first, second, and third thresholds to the UE.

14. The method of claim 2 wherein the network broadcasts the first, second, and third thresholds to all UE in a cell.

15. The method of claim 2 wherein assuming an Out-of-sync or In-sync status comprises the L1 layer in the UE signaling an Out-of-sync or In-sync status, respectively, to higher network layers in the UE.

16. A User Equipment (UE) having a selectively enabled advanced receiver feature and operative in a wireless communication network, comprising:
    one or more antennas;
    a transceiver operatively connected to the antennas; and
    processing circuits operatively connected to the transceiver, and operative to
        selectively enable and disable the advanced receiver feature while the UE maintains an In-sync status wherein the network schedules communications to the UE;
        measure received signal quality on one or more channels and generate a signal quality metric;
        monitor the signal quality metric;
        assume an Out-of-sync status, wherein the network does not schedule communications to the UE, if the advanced receiver feature is disabled and the signal quality metric meets a first threshold; and
        assume the Out-of-sync status if the advanced receiver feature is enabled and the signal quality metric meets a second threshold indicating lower signal quality than the first threshold.

17. The UE of claim 16 wherein the processing circuits are further operative, when the UE is Out-of-sync, to:
    measure received signal quality on one or more channels to generate a signal quality metric;
    monitor the signal quality metric; and
    assume an In-sync status, wherein the network schedules data to the UE, if the signal quality metric meets a third threshold, regardless of whether the advanced receiver feature is enabled or disabled.

18. The UE of claim 16 wherein the advanced receiver feature comprises enabling more than two antennas.

19. The UE of claim 18 wherein the advanced receiver feature comprises enabling four antennas.

20. The UE of claim 16 wherein the advanced receiver feature comprises a Minimum Mean Square Error (MMSE) technique to improve receiver performance.

21. The UE of claim 16 wherein the advanced receiver feature comprises an Interference Rejection Combiner (IRC) technique to improve receiver performance.

22. The UE of claim 16 wherein the advanced receiver feature comprises an advanced cancellation of neighboring cell interference technique to improve receiver performance.

23. The UE of claim 16 wherein the first threshold is a Block Error Rate (BLER) of 10% and the second threshold is a BLER of greater than 10%.

24. The UE of claim 17 wherein the third threshold is a BLER of 2%.

25. The UE of claim 16 wherein the first threshold is a Signal to Noise Ratio (SNR) corresponding to a BLER of 10% and the second threshold is a SNR corresponding to a BELR of greater than 10%.

26. The UE of claim 17 wherein the third threshold is a SNR corresponding to a BELR of 2%.

27. The UE of claim 16 wherein the processing circuits are further operative to signal to the network when the advanced receiver feature is enabled or disabled.

28. The UE of claim 17 wherein the network signals the first, second, and third thresholds to the UE.

29. The UE of claim 17 wherein the network broadcasts the first, second, and third thresholds to all UE in a cell.

30. The UE of claim 17 wherein assuming an Out-of-sync or In-sync status comprises the L1 layer in the UE signaling an Out-of-sync or In-sync status, respectively, to higher network layers in the UE.

31. A non-transitory computer-readable medium containing program instructions which, when executed in User Equipment (UE) having a selectively enabled advanced receiver feature and operative in a wireless communication network, are operative to cause the UE to perform the steps of:

selectively enabling and disabling the advanced receiver feature while the UE maintains an In-sync status wherein the network schedules communications to the UE;

measuring received signal quality on one or more channels and generating a signal quality metric;

monitoring the signal quality metric;

assuming an Out-of-sync status, wherein the network does not schedule communications to the UE, if the advanced receiver feature is disabled and the signal quality metric meets a first threshold; and assuming the Out-of-sync status if the advanced receiver feature is enabled and the signal quality metric meets a second threshold indicating lower signal quality than the first threshold.

32. The non-transitory computer-readable medium of claim 31 wherein the program instructions are further operative to cause the UE to perform the following steps, when the UE is Out-of-sync:

measuring received signal quality on one or more channels to generate a signal quality metric;

monitoring the signal quality metric; and assuming an In-sync status, wherein the network schedules data to the UE, if the signal quality metric meets a third threshold, regardless of whether the advanced receiver feature is enabled or disabled.

* * * * *